United States Patent
Nielsen et al.

(10) Patent No.: US 12,420,815 B2
(45) Date of Patent: Sep. 23, 2025

(54) AUTOMATIC TESTING OF AUTONOMOUS VEHICLES

(71) Applicant: GM Cruise Holdings LLC, San Francisco, CA (US)

(72) Inventors: Erik Nielsen, Peoria, AZ (US); Chase Kaufman, Fountain Hills, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/471,062

(22) Filed: Sep. 20, 2023

(65) Prior Publication Data
US 2024/0010212 A1   Jan. 11, 2024

Related U.S. Application Data

(63) Continuation of application No. 16/831,095, filed on Mar. 26, 2020, now Pat. No. 11,794,759.

(51) Int. Cl.
*B60W 50/00* (2006.01)
*B60W 50/04* (2006.01)
*G06N 20/00* (2019.01)
*G07C 5/00* (2006.01)
*G07C 5/08* (2006.01)

(52) U.S. Cl.
CPC ......... *B60W 50/045* (2013.01); *G06N 20/00* (2019.01); *G07C 5/008* (2013.01); *G07C 5/0808* (2013.01)

(58) Field of Classification Search
CPC ............... B60W 50/045; B60W 60/00; B60W 2050/046; G06N 20/00; G07C 5/008; G07C 5/0808; G05B 2219/2637; G05B 19/042; G05B 23/0237
See application file for complete search history.

(56) References Cited

U.S. PATENT DOCUMENTS

| | | |
|---|---|---|
| 7,103,460 B1* | 9/2006 | Breed .................. G07C 5/008 706/15 |
| 10,144,380 B2 | 12/2018 | Laskey et al. |
| 10,423,934 B1* | 9/2019 | Zanghi ............... G06Q 10/1097 |
| 10,802,486 B1 | 10/2020 | Paul et al. |
| 10,883,844 B2 | 1/2021 | Ogale et al. |
| 2014/0160295 A1 | 6/2014 | Kyomitsu et al. |
| 2015/0145995 A1 | 5/2015 | Shahraray et al. |
| 2016/0042644 A1 | 2/2016 | Velusamy |
| 2017/0243370 A1 | 8/2017 | Hoye et al. |
| 2017/0274855 A1* | 9/2017 | Laskey ................ G08G 1/0141 |
| 2017/0278312 A1* | 9/2017 | Minster .................. G07C 5/006 |
| 2017/0300049 A1 | 10/2017 | Seally |
| 2017/0358151 A1* | 12/2017 | Koons .................... G07C 5/08 |
| 2017/0364869 A1* | 12/2017 | Tarte .................. G06Q 10/1095 |
| 2018/0050704 A1 | 2/2018 | Tascione et al. |

(Continued)

*Primary Examiner* — Peter D Nolan
*Assistant Examiner* — Peter Y Ning
(74) *Attorney, Agent, or Firm* — CANTOR COLBURN LLP

(57) ABSTRACT

The present technology is effective to cause at least one processor to instruct an autonomous vehicle to navigate a specific course and to record diagnostic measurements while navigating the specific course, receive the diagnostic measurements from the autonomous vehicle, and analyze the diagnostic measurements from the autonomous vehicle in a context provided by a collection of diagnostic measurement data collected from a fleet of similar autonomous vehicles navigating the specific course.

20 Claims, 4 Drawing Sheets

(56) References Cited

U.S. PATENT DOCUMENTS

| | | |
|---|---|---|
| 2018/0130353 A1 | 5/2018 | Pandurangarao |
| 2018/0154906 A1* | 6/2018 | Dudar et al. |
| 2018/0308191 A1* | 10/2018 | Matthiesen ........ G01C 21/3407 |
| 2018/0342113 A1* | 11/2018 | Kislovskiy ............. G07C 5/008 |
| 2019/0047580 A1 | 2/2019 | Kwasnick |
| 2019/0197177 A1 | 6/2019 | Bielby |
| 2019/0197798 A1* | 6/2019 | Abari ..................... G06Q 10/02 |
| 2019/0226862 A1 | 7/2019 | Shaukat et al. |
| 2019/0259226 A1 | 8/2019 | Ford |
| 2020/0023846 A1* | 1/2020 | Husain ................... H04W 4/44 |
| 2020/0097009 A1* | 3/2020 | Garg ...................... G05D 1/646 |
| 2020/0106678 A1 | 4/2020 | Grill et al. |
| 2020/0117565 A1 | 4/2020 | Ponnuvel et al. |
| 2020/0125472 A1 | 4/2020 | Arechiga Gonzalez et al. |
| 2021/0078588 A1 | 3/2021 | Zhu et al. |
| 2021/0097311 A1 | 4/2021 | McBeth et al. |
| 2021/0229678 A1 | 7/2021 | Wang et al. |
| 2021/0370968 A1 | 12/2021 | Xiao et al. |

\* cited by examiner

AUTOMATIC TESTING OF AUTONOMOUS VEHICLES

CROSS-REFERENCE TO RELATED APPLICATIONS

This application is a continuation of U.S. Non-Provisional patent application Ser. No. 16/831,095, entitled "AUTOMATIC TESTING OF AUTONOMOUS VEHICLES", filed on Mar. 26, 2020, the contents of which are incorporated herein by reference in their entirety and for all purposes.

TECHNICAL FIELD

The present technology relates to automatic testing of autonomous vehicles, and more particularly to instructing autonomous vehicles to initiate specific maneuvers on a specific course to receive and analyze diagnostic measurements.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Over the lifetime of a vehicle, the vehicle will likely require maintenance and repairs due to wear and tear of parts, impact incidents that are severe enough to cause damage to the vehicle, etc. Skilled human drivers can identify the damage and need for maintenance and repairs using their own senses. Furthermore, inspections to determine whether damage and/or wear and tear necessitates maintenance and repairs may be costly, time-consuming, and inefficient.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Over the lifetime of a vehicle, the vehicle will likely require maintenance and repairs due to wear and tear of parts, impact incidents that are severe enough to cause damage to the vehicle, etc. Some skilled human drivers can identify the damage and need for maintenance and repairs using their own senses. Other human drivers will need to bring the vehicle to a mechanic or other inspection facility to identify damages and needs for maintenance and/or repairs. These inspections to determine whether damage and/or wear and tear necessitates maintenance and repairs may be costly, time-consuming, and inefficient.

Autonomous vehicles eliminated the need for human drivers, and therefore vehicles are often without any personnel that can assess the functioning of the autonomous vehicle. Although autonomous vehicles may utilize regularly scheduled vehicle inspections to check for needed services or repairs, such scheduled inspections are still costly and time-consuming. Avoiding extra servicing is important since these inspections are costly due to the manual labor involved and reduced vehicle availability. Autonomous vehicles also have many sensors that can, in some specific situations, identify values and measurements that may aid in determining when inspection, maintenance, and/or repairs may be needed.

Road conditions can cause variations in sensor measurements. Therefore, diagnosing vehicle maintenance needs is difficult to do without normalizing for road conditions and vehicle age, etc.

Accordingly, the disclosed technology addresses the need for a more advanced method and system to instruct an autonomous vehicle to receive diagnostic measurements and analyze the received diagnostic measurements. In some embodiments, the present technology can involve an autonomous vehicle driving a specific course for which other autonomous vehicles have also driven in order to collect more meaningful data that might allow a computing system to identify likely needed repairs without requiring the autonomous vehicle to be first diagnosed by a technician at a service station.

Figure 1:
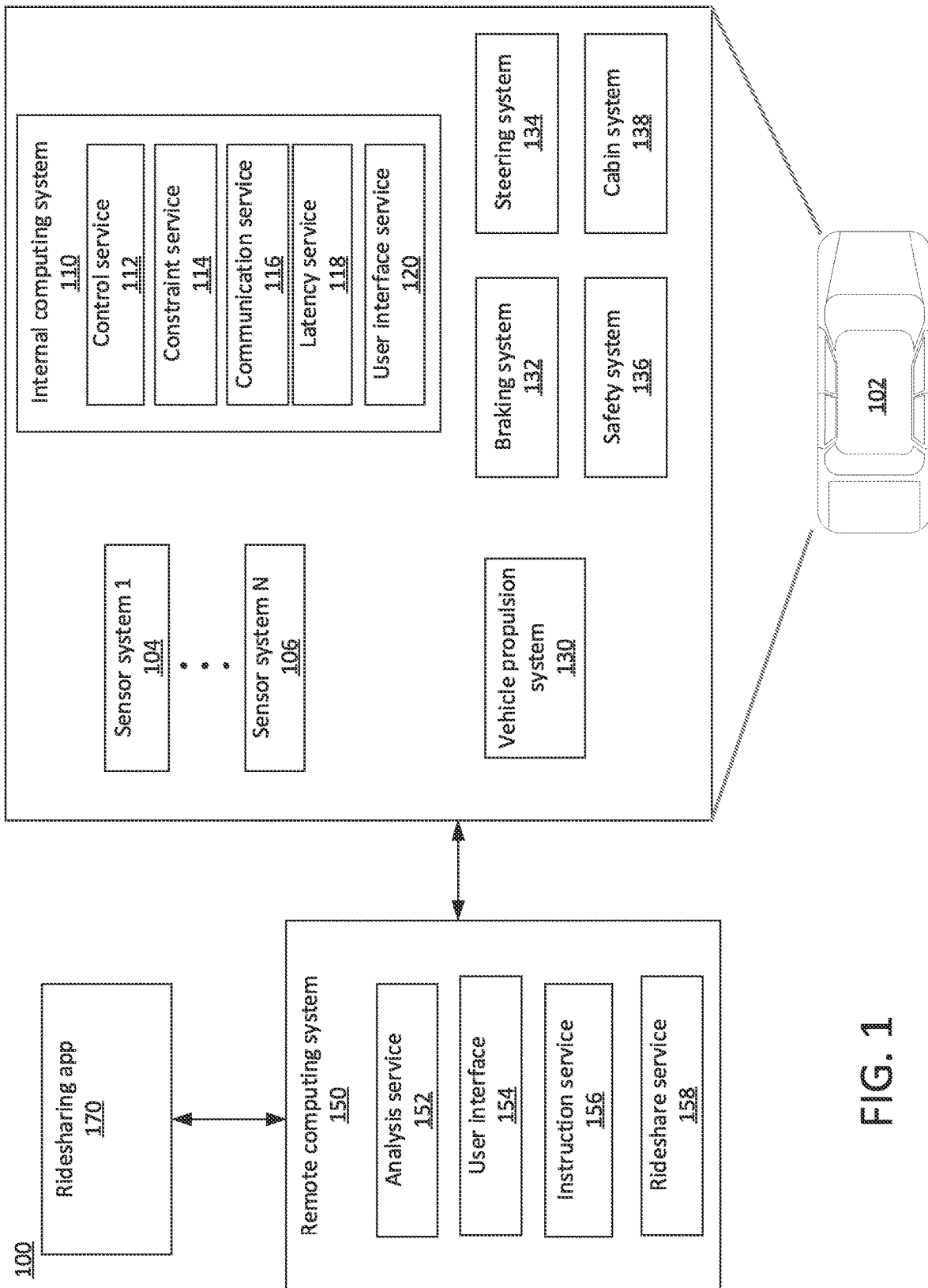
FIG. 1 shows an example system for operating an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, frequency detection sensors, vibration detection sensors, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
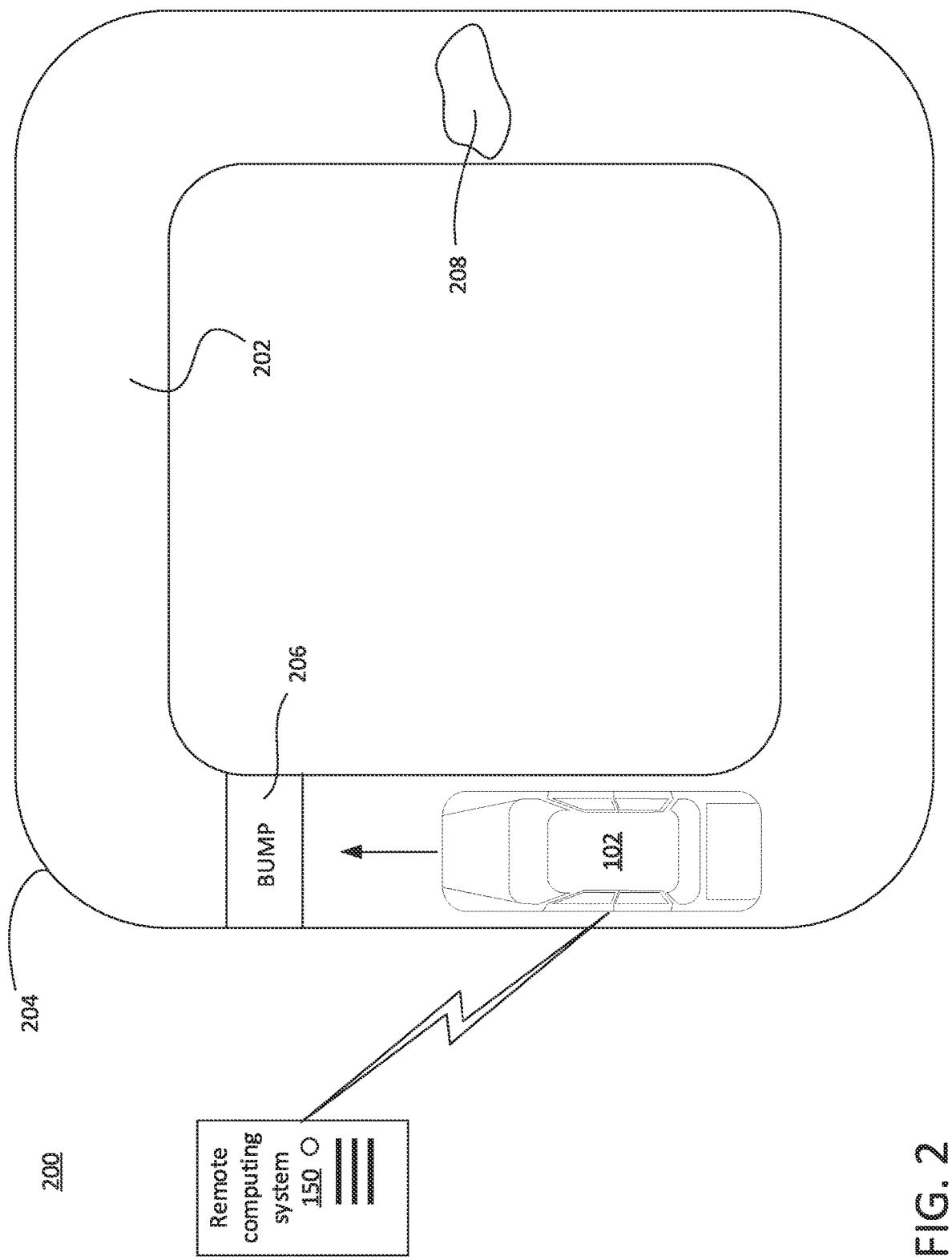
FIG. 2 shows an example environment, in which a remote computing system automatically tests an autonomous vehicle in accordance with some aspects of the present technology.

FIG. 2 shows an example environment 200, in which a remote computing system 150 communicates with an autonomous vehicle 102 to automatically test the autonomous vehicle 102. More specifically, the remote computing system 150 sends instructions to the autonomous vehicle 102 to drive on a specific course 202.

The specific course 202 can be any drivable surface including public roads or a private testing track. The specific course 202 is a course that has been traveled a statistically significant number of times by a variety of autonomous vehicles such that any data collected from those vehicles has been analyzed to determine normal and abnormal data for the specific locations on the specific course 202. In some embodiments, a specific course 202 can be selected as the specific course 202 when it exhibits characteristics sufficient to test driving systems on the autonomous vehicle 102. The specific course 202 may include various obstacles 204-208, such as corners 204, bumps 206, and/or potholes 208, that may cause movements of various components on the autonomous vehicle 102 when the autonomous vehicle 102 traverses the obstacle 204-208.

As the autonomous vehicle 102 traverses the specific course 202, the autonomous vehicle 102 sends diagnostic data to the remote computing system 150. In some embodiments, the autonomous vehicle 102 can stream data from its sensors to remote computing system 150. In some embodiments, autonomous vehicle 102 can store all the collected data while traversing the course and can compress the data before sending to the remote computing system 150. In some embodiments, the autonomous vehicle 102 only sends diagnostic data to the remote computing system 150 when the autonomous vehicle 102 encounters the various obstacles 204-208. For example, the autonomous vehicle 102 may drive over the bump 206 and send the diagnostic data before, during, and after encountering the bump 206. In some embodiments, the autonomous vehicle 102 can include logic to identify sensor values and measurements that are outside a threshold, and can only send values outside the threshold to the remote computing system 150. In some embodiments, the threshold values can vary based on location on the specific course 204.

Sensors 104-106 of the autonomous vehicle 102 may collect the diagnostic data, which includes measurements from sensors monitoring performance of parts or components of the autonomous vehicle 102. The measurements and/or diagnostic data may also include a value corresponding to the performance of parts or components on the autonomous vehicle 102. For example, the diagnostic data may include a vertical displacement value associated with a suspension system of the autonomous vehicle 102 before, during, and after the autonomous vehicle 102 drives over the bump 206. A rapid change in vertical displacement, before, during, and/or after the autonomous vehicle 102 driving over the bump may indicate that a component or part of the suspension system, such as springs or struts, are underperforming or suboptimal. Similarly, when an autonomous vehicle 102 initiates a maneuver at specific locations on the specific course 202, such as making a sharp turn through corner 204 at a high speed, compression of the components or parts of the suspension system will differ amongst each wheel assembly. Thus, the diagnostic data would differ more greatly for each wheel assembly, which will allow improved accuracy and precision in determining whether a single component or part is suboptimal. The same is also true when driving over a pothole with one or two wheels.

As another example, the sensors 104-106 may include microphones or other sensors that collect sound recordings and/or detect decibel levels. The microphones may then collect decibel levels near brake assemblies with indicators that, when a brake pad is wearing out, cause an audible sound. Thus, when the microphones detect decibel levels above a threshold level, the measurement data would indicate that the brake pad is wearing out or worn out. Accordingly, the remote computing system 150, may determine, after receiving the measurement data, that the brake pads are worn out. It is further contemplated that the microphones may be used in other capacities to detected unexpected noises including, but not limited to, near suspension components, near engine mounts, etc.

The diagnostic data can then be analyzed against a collection of diagnostic measurement data collected from a fleet of similar autonomous vehicles navigating the specific course 202. More specifically, the collection of diagnostic measurement data may provide a context, in which the diagnostic data may be analyzed and/or compared against. The fleet of similar autonomous vehicles may be autonomous vehicles of similar makes, models. In some embodiments, the similar vehicles may be of approximately the same age, approximately the same mileage or range of miles driven, and/or similar routine maintenances performed on the autonomous vehicles. The collection of diagnostic data may include the same information as the measurement data disclosed above.

Figure 3:
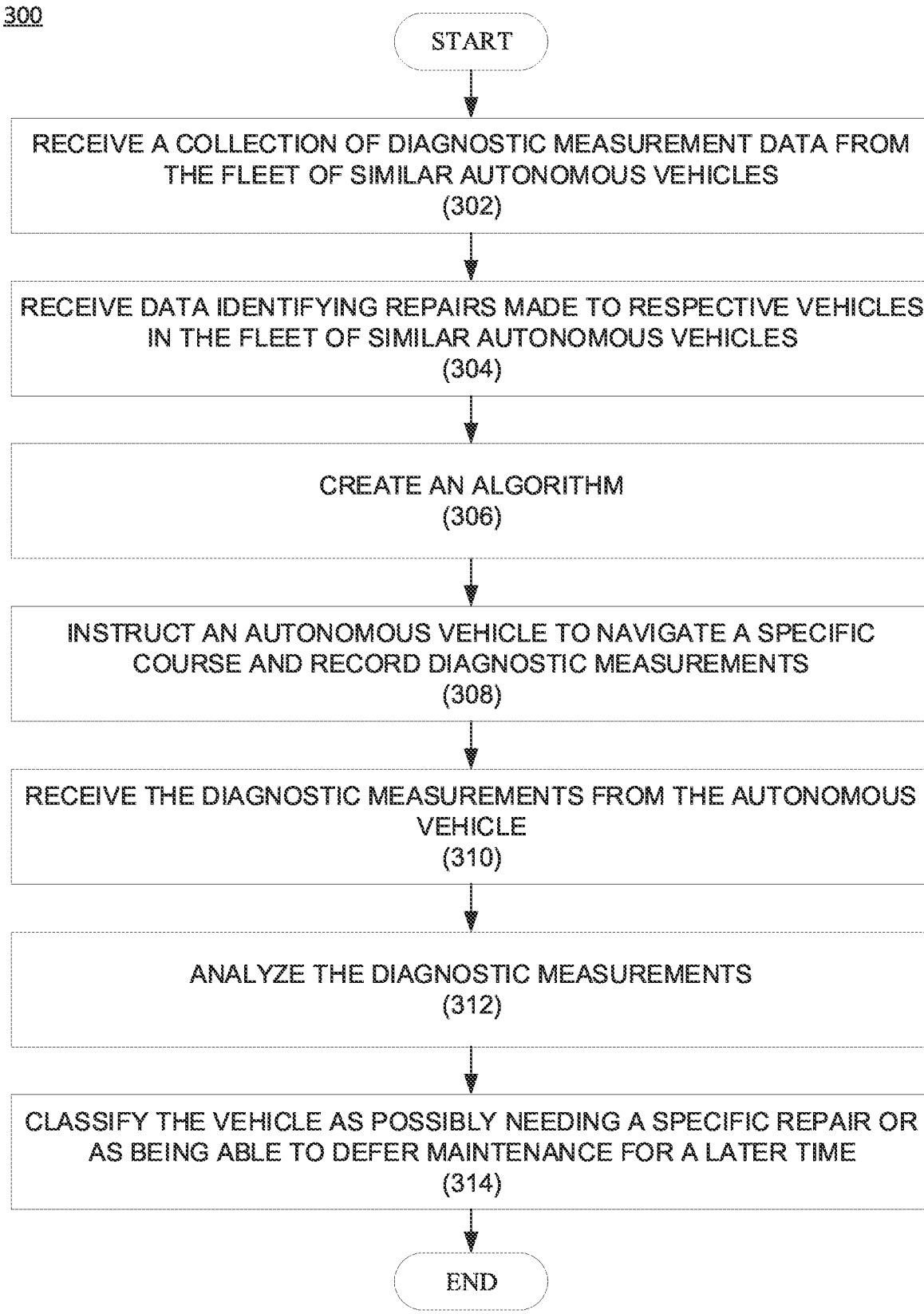
FIG. 3 shows an example method implemented by a remote computing system to automatically test autonomous vehicles in accordance with some aspects of the present technology.

FIG. 3 shows an example method 300 implemented by a remote computing system 150 to automatically test an autonomous vehicle 102. In some embodiments, the method 300 begins with the remote computing system 150 receiving 302 a collection of diagnostic measurement data from a fleet of similar autonomous vehicles. More specifically, the collection of diagnostic measurement data is based upon the fleet of similar autonomous vehicles navigating the specific course 202.

In some embodiments, the remote computing system 150 receives 304 data identifying repairs made to respective vehicles in the fleet of similar autonomous vehicles. More specifically, the data identifying repairs made to respective vehicles in the fleet is based on repairs performed in response to determining that the respective vehicle had suboptimal components or parts.

In some embodiments, the remote computing system 150 creates an algorithm 306. The algorithm receives diagnostic measurement data collected from the fleet of similar autonomous vehicles to classify an autonomous vehicle as possibly needing a specific repair or as being able to defer maintenance for a later time. In some embodiments, the diagnostic measurement data may be compared against a threshold value or a threshold deviation from an average value. It is further contemplated that, in some embodiments, the algorithm is sent to the autonomous vehicle 102 for the autonomous vehicle 102 to implement.

In some embodiments, the algorithm is a machine learning model that takes various inputs, such as the diagnostic measurement data collected from the fleet of similar autonomous vehicles, respective classifications of whether the autonomous vehicle possibly needs a specific repair or as being able to defer maintenance for a later time, and the data identifying repairs made to respective vehicles in the fleet. The machine learning model may then classify an autonomous vehicle as possibly needing a specific repair or as being able to defer maintenance for a later time based upon received diagnostic measurement data. It is similarly contemplated that the remote computing system 150 may make both a heuristic algorithm and a machine learning model. In such embodiments, the heuristic algorithm may identify obvious needs for repairs, while the machine learning model may identify more subtle issues that need repairs. Furthermore, in some embodiments, the algorithm may be implemented by the autonomous vehicle 102, such that the machine learning model may only receive diagnostic measurement data that has values close to the threshold value or threshold deviation from a determine value, such as the average value.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

The remote computing system 150 instructs 308 an autonomous vehicle 102 to navigate a specific course 202 and to record diagnostic measurements. In some embodiments, the remote computing system also instructs 308 the autonomous vehicle 102 to perform specific or particular maneuvers on the specific course at specific locations on the specific course. For example, the specific maneuvers may be to make a sharp turn at a corner of the specific course at a high speed. The diagnostic measurements include values obtained from sensors of the autonomous vehicle 102. The values may be indicative of a status of various components or parts and/or a change in the components or parts. For example, as the autonomous vehicle 102 makes a sharp turn at a high speed, each suspension component may compress at different times and amounts. The values may thus be the compression at different points in time during the turn.

It is contemplated that instructing 308 the autonomous vehicle 102 to navigate the specific course 202 may occur responsively to a communication received from the autonomous vehicle 102 indicating that the autonomous vehicle 102 has detected a severe impact. It is further contemplated that instructing 308 the autonomous vehicle 102 to navigate the specific course 202 may occur at predetermined intervals based upon time since previous maintenance, mileage, number of impact events, number of starts and/or stops, hours of operation, number of turns, etc. Similarly, instructing 308 the autonomous vehicle 102 to navigate the specific course 202 may occur after inspecting, servicing, and/or repairing the autonomous vehicle 102.

The remote computing system 150 then receives 310 diagnostic measurements data from the autonomous vehicle 102. More specifically, the remote computing system 150 may receive 310 the diagnostic measurements from the communication service 116 of the autonomous vehicle 102.

As discussed above, in embodiments where the algorithm is implemented on the autonomous vehicle 102 to reduce an amount of data sent to the machine learning model, the diagnostic measurement data may be a portion of all of the diagnostic measurement data. By having only a portion of the diagnostic measurement data being communicated, bandwidth of communication between the autonomous vehicle 102 and the remote computing system 150 may be efficiently maximized. This may be particularly helpful because cellular and/or Wi-Fi bandwidth may be limited near the specific course 202. However, it is understood that there are also benefits to sending all of the diagnostic measurement data, despite the increased amount of bandwidth used. For example, having all of the diagnostic measurement data will allow the machine learning model to learn and determine when the autonomous vehicle 102 is driving smoothly, driving under stress, handling obstacles, etc.

The remote computing system 150 then analyzes 312 the diagnostic measurements. More specifically, the remote computing system 150 may analyze 312 the diagnostic measurements in a context provided by a collection of diagnostic measurement data collected from a fleet of similar autonomous vehicles navigating the specific course. In other words, the collection of diagnostic measurement data provides a calibrated set of values derived from values from sensors of respective autonomous vehicles to compare the diagnostic measurements against.

In some embodiments, the analyzing 312 further includes determining that a value from a sensor in the diagnostic measurements is beyond a threshold deviation from values from the sensor represented in the collection of diagnostic measurement data collected from the fleet of similar autonomous vehicles. In other words, the collection of diagnostic measurement data may be used to create a threshold value or an average value with a threshold deviation therefrom. Thus, the analyzing 312 may further include determining that a value from a sensor in the diagnostic measurements is beyond the threshold value or beyond the threshold deviation from the average value. For example, the collection of diagnostic measurement data may include average vertical displacement before, during, and after driving over the pothole 208. After the autonomous vehicle 102 drives over the pothole 208, the remote computing system 150 receives 310 and analyzes 312 the vertical displacement of the autonomous vehicle 102 before, during, and after driving over the pothole 208. If the vertical displacement of the autonomous vehicle 102 exceeds the threshold value and/or is beyond a threshold deviation from the average value, the remote computing system 150 may determine that the suspension system of the autonomous vehicle 102 is suboptimal.

In embodiments using a machine learning model, the analyzing 312 may utilize the collection of diagnostic measurement data to further define and/or update the threshold value and/or threshold deviation from a determine value, such as an average value. Furthermore, the diagnostic measurement data and the collection of measurement data may have various values for various different components, some of which may not exceed a heuristically determined threshold value. However, a machine learning model may collectively analyze 312 the various values, identify correlations between values of different components, and determine trends from various values and the correlations of the values. In other words, the machine learning model may, in comparison to a heuristic algorithm, identify more subtle issues in components on the autonomous vehicle 102. As stated above, the machine learning model and the heuristic algorithm may be implemented side-by-side to further increase accuracy and precision in analyzing 312 the measurement data and the collection of measurement data.

The remote computing system 150 then classifies 314 the autonomous vehicle 102 as needing a specific repair or as being able to defer maintenance for a later time. More specifically, based upon the analysis 312 of the measurement data, the remote computing system 150 may classify 314 whether the autonomous vehicle 102 needs the specific repair or is able to defer maintenance for a later time. If the remote computing system 150 classifies 314 the autonomous vehicle as needing a specific repair, the remote computing system may then schedule a service for the autonomous vehicle 102. In some embodiments, a specific time, destination, and route to the destination may also be communicated to the autonomous vehicle 102. If the remote computing system 150 classifies 314 the autonomous vehicle 102 as being able to defer maintenance, then the remote computing system 150 may provide routing instructions to the autonomous vehicle 102 to continue normal operations, such as ridesharing operations, mapping operations, etc.

As stated above, a machine learning model may allow for identification of more subtle issues in components of the autonomous vehicle 102. Accordingly, the machine learning may then classify 314 the autonomous vehicle 102 as needing a specific repair or as being able to defer maintenance for a later time based on the identification of these issues. For example, a bent rim that is still capable of holding air may not be classified as an issue by a heuristic algorithm, but the machine learning model may classify the bent rim as an issue that needs to be repaired quickly. Similarly, in some embodiments, a heuristic algorithm first analyzes 312 the diagnostic measurement data and, if the classification is unclear or near thresholds, the machine learning model may then analyze 312 the diagnostic measurement data and classify 314 the autonomous vehicle 102. In other words, in some embodiments, the heuristic algorithm may analyze all of the diagnostic measurement data, while the machine learning model may only analyze some of the diagnostic measurement data.

It is further contemplated that the measurement data and the classification may be added to the collection of diagnostic measurement data to update and train the machine learning model.

It is similarly contemplated that, as the machine learning model receives more inputs, the machine learning model may also begin to determine more efficient intervals to schedule autonomous vehicles 102 to navigate the specific course 202. For example, the machine learning model may determine that, instead of every 10,000 miles, every 5,000 starts and stops is when autonomous vehicles experience an increased need for maintenance and/or repairs. Thus, the remote computing system 150 would begin instructing 308 autonomous vehicles 102 to navigate the specific course every 20,000 miles. In some embodiments, this is implemented in a second machine learning model.

Similarly, in some embodiments, the remote computing system 150 may receive constant sensor data from an autonomous vehicle 102. As the autonomous vehicle 102 navigates streets, it may encounter an impact event, a sensor reading that appears abnormal, a sensor reading that appears abnormal then quickly returns to a normal range, or many other possible concerns for the autonomous vehicle 102. The remote computing system 150 may then instruct the autonomous vehicle 102 to navigate the specific course 202. The constant sensor data may also be used in the machine learning model to further identify efficient intervals to schedule autonomous vehicles 102 to navigate the specific course 202. For example, the machine learning model determine that when an autonomous vehicle 102 navigates a specific street, it is likely that there is an issue after navigated the specific street. Thus, the machine learning model may further determine the efficient interval by including a frequency of or elapsed amount of time since navigating the specific street.

It is to be understood that the method 300 may be implemented in various ways. For example, receiving 302 the collection of diagnostic measurement data, receiving 304 data, and training the machine learning model may occur before, concurrently, and/or after instructing 308 the autonomous vehicle, receiving 310 the diagnostic measurements, and analyzing 312 the diagnostic measurements.

Figure 4:
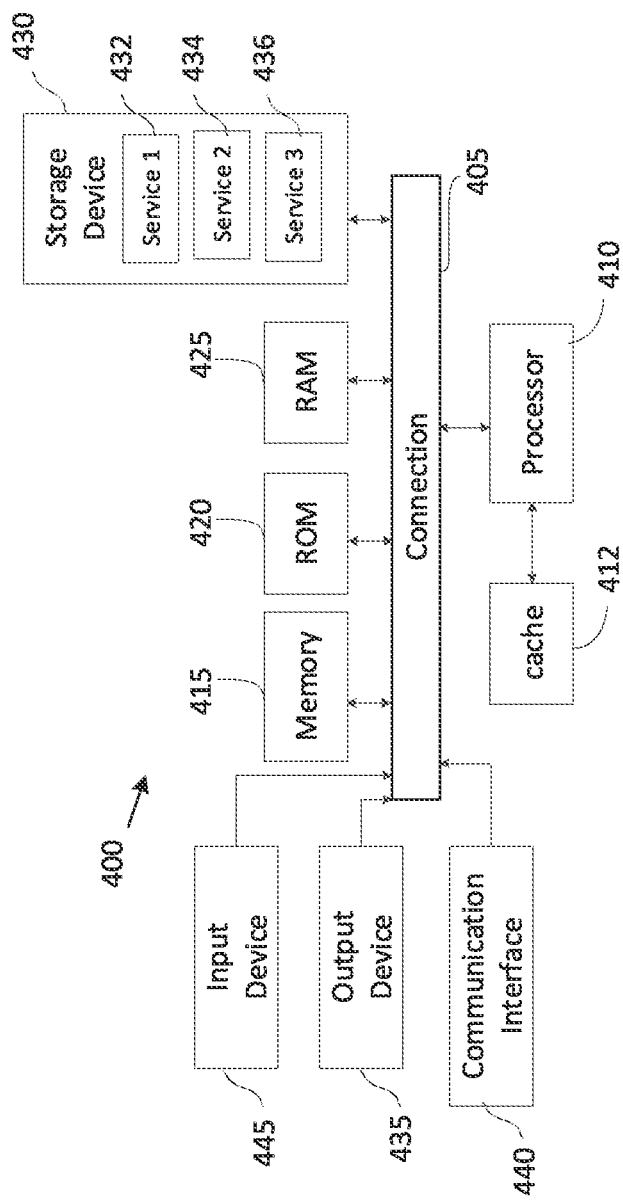
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
instructing an autonomous vehicle (AV) to navigate a specific road segment;
receiving, from the AV, diagnostic measurements that are collected while navigating the road segment;
analyzing the diagnostic measurements from the AV against a collection of diagnostic measurement data collected from a fleet of similar AVs navigating the road segment, wherein the fleet of similar AVs includes vehicles of a same model;
obtaining data identifying repairs made to at least one AV in the fleet of similar AVs, where the repairs were performed in response to determining that the at least one AV in the fleet had suboptimal components or parts; and
identifying one or more repairs that are needed for the AV based on the analysis of the diagnostic measurements from the AV against the collection of diagnostic measurement data collected from the fleet of similar AVs and based on the data identifying repairs made to the at least one AV in the fleet of similar AVs.

2. The method of claim 1, wherein analyzing the diagnostic measurements from the AV against the collection of diagnostic measurement data collected from the fleet of similar AVs includes:
analyzing, using a machine learning algorithm, the diagnostic measurements from the AV against the collection of diagnostic measurement data collected from the fleet of similar AVs, wherein the machine learning algorithm is configured to receive the diagnostic measurements from the AV and output a respective classification of repairs needed for the AV.

3. The method of claim 1, wherein analyzing the diagnostic measurements from the AV against the collection of diagnostic measurement data collected from the fleet of similar AVs includes:
identifying, from the diagnostic measurements that are collected by the AV, at least one measurement that is outside a threshold measurement for at least one sensor of the AV.

4. The method of claim 1, wherein analyzing the diagnostic measurements from the AV against the collection of diagnostic measurement data collected from the fleet of similar AVs includes:
identifying, from the diagnostic measurements that are collected by the AV, at least one measurement that is greater than a threshold deviation from a threshold value, wherein the threshold value is determined based on the collection of diagnostic measurement data collected from the fleet of similar AVs.

5. The method of claim 1, wherein the diagnostic measurements from the AV include a measurement from one or more sensors of the AV.

6. The method of claim 1, wherein instructing the AV to navigate the specific road segment include instructing the AV to perform one or more specific maneuvers on the specific road segment.

7. The method of claim 1, further comprising:
in response to identifying the one or more repairs that are needed for the AV, determining a timing of the one or more repairs for the AV.

8. The method of claim 1, wherein the diagnostic measurements from the AV include at least one measurement from a suspension sensor associated with a vertical displacement relative to a ground.

9. The method of claim 1, wherein the diagnostic measurements from the AV include one or more sound recordings or one or more decibel levels.

10. The method of claim 1, wherein the specific road segment is a road segment that has been traveled a statistically significant number of times by various autonomous vehicles.

11. A system comprising:
a memory; and
one or more processors coupled to the memory, the one or more processors configured to:
instruct an autonomous vehicle (AV) to navigate a specific road segment;
receive, from the AV, diagnostic measurements that are collected while navigating the road segment;
analyze the diagnostic measurements from the AV against a collection of diagnostic measurement data collected from a fleet of similar AVs navigating the road segment, wherein the fleet of similar AVs includes vehicles of a same model;
obtain data identifying repairs made to at least one AV in the fleet of similar AVs, where the repairs were performed in response to determining that the at least one AV in the fleet had suboptimal components or parts; and
identify one or more repairs that are needed for the AV based on the analysis of the diagnostic measurements from the AV against the collection of diagnostic measurement data collected from the fleet of similar AVs and based on the data identifying repairs made to the at least one AV in the fleet of similar AVs.

12. The system of claim 11, wherein analyzing the diagnostic measurements from the AV against the collection of diagnostic measurement data collected from the fleet of similar AVs includes:
analyzing, using a machine learning algorithm, the diagnostic measurements from the AV against the collection of diagnostic measurement data collected from the fleet of similar AVs, wherein the machine learning algorithm is configured to receive the diagnostic measurements from the AV and output a respective classification of repairs needed for the AV.

13. The system of claim 11, wherein analyzing the diagnostic measurements from the AV against the collection of diagnostic measurement data collected from the fleet of similar AVs includes:
identifying, from the diagnostic measurements that are collected by the AV, at least one measurement that is outside a threshold measurement for at least one sensor of the AV.

14. The system of claim 11, wherein analyzing the diagnostic measurements from the AV against the collection of diagnostic measurement data collected from the fleet of similar AVs includes:
identifying, from the diagnostic measurements that are collected by the AV, at least one measurement that is greater than a threshold deviation from a threshold value, wherein the threshold value is determined based on the collection of diagnostic measurement data collected from the fleet of similar AVs.

15. The system of claim 11, wherein the diagnostic measurements from the AV include a measurement from one or more sensors of the AV.

16. The system of claim 11, wherein instructing the AV to navigate the specific road segment includes instructing the AV to perform one or more specific maneuvers on the specific road segment.

17. The system of claim 11, wherein the one or more processors are configured to:
in response to identifying the one or more repairs that are needed for the AV, determining a timing of the one or more repairs for the AV.

18. The system of claim 11, wherein the diagnostic measurements from the AV include at least one measurement from a suspension sensor associated with a vertical displacement relative to a ground.

19. The system of claim 11, wherein the specific road segment is a road segment that has been traveled a statistically significant number of times by various autonomous vehicles.

20. A non-transitory computer readable medium comprising instructions stored thereon, the instructions effective to cause at least one processor to:

instruct an autonomous vehicle (AV) to navigate a specific road segment;

receive, from the AV, diagnostic measurements that are collected while navigating the road segment;

analyze the diagnostic measurements from the AV against a collection of diagnostic measurement data collected from a fleet of similar AVs navigating the road segment, wherein the fleet of similar AVs includes vehicles of a same model;

obtain data identifying repairs made to at least one AV in the fleet of similar AVs, where the repairs were performed in response to determining that the at least one AV in the fleet had suboptimal components or parts; and identify one or more repairs that are needed for the AV based on the analysis of the diagnostic measurements from the AV against the collection of diagnostic measurement data collected from the fleet of similar AVs and based on the data identifying repairs made to the at least one AV in the fleet of similar AVs.

* * * * *